(12) United States Patent
Kärkäs et al.

(10) Patent No.: US 7,873,989 B2
(45) Date of Patent: Jan. 18, 2011

(54) WIRELESS ACCESS DEVICE

(75) Inventors: Kalle J. Kärkäs, Oulu (FI); Matti Kantola, Nokia (FI); Jaakko Pääkkönen, Oulu (FI)

(73) Assignee: Nokia Corporation, Espoo (FI)

( * ) Notice: Subject to any disclaimer, the term of this patent is extended or adjusted under 35 U.S.C. 154(b) by 837 days.

(21) Appl. No.: 09/893,165

(22) Filed: Jun. 27, 2001

(65) Prior Publication Data
US 2002/0031228 A1 Mar. 14, 2002

(30) Foreign Application Priority Data
Jun. 27, 2000 (GB) ................ 0015716.4

(51) Int. Cl.
*G06F 7/04* (2006.01)
(52) U.S. Cl. ............. 726/7; 340/5.26; 340/5.24; 380/270
(58) Field of Classification Search ......... 713/182; 340/5.24, 5.28; 380/270; 726/7
See application file for complete search history.

(56) References Cited

U.S. PATENT DOCUMENTS

| | | | | |
|---|---|---|---|---|
| 5,260,551 A | * | 11/1993 | Wiik et al. | 340/5.28 |
| 6,175,922 B1 | * | 1/2001 | Wang | 713/182 |
| 6,975,202 B1 | * | 12/2005 | Rodriguez et al. | 340/5.25 |
| 7,012,503 B2 | * | 3/2006 | Nielsen | 340/5.6 |

FOREIGN PATENT DOCUMENTS

| | | |
|---|---|---|
| EP | 0416792 | 3/1991 |
| EP | 0810559 | 12/1997 |
| EP | 0856624 | 8/1998 |
| GB | 2202354 | 9/1988 |
| WO | WO 93/14571 | 7/1993 |
| WO | WO 94/01963 | 1/1994 |

OTHER PUBLICATIONS

How Stuff Works, How Bluetooth Works, printed Oct. 28, 2004, http://electronics.howstuffworks.com/bluetooth.htm/printable, pp. 4-5.*

* cited by examiner

*Primary Examiner*—Jacob Lipman
(74) *Attorney, Agent, or Firm*—Perman & Green, LLP

(57) ABSTRACT

An access device includes means for receiving, via a wireless communication link, a key and validity information. The access device also includes wireless communication means for establishing a connection with another party, and for providing the key and validity information to that party. If the key and validity information are determined by the other party to be valid access is provided.

26 Claims, 3 Drawing Sheets

WIRELESS ACCESS DEVICE

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION (1) Field of the Invention

The present invention relates to a device and in particular but not exclusively to a device which provides access to an entity.

(2) Description of Related Art

Including information disclosed under 37 CFR 1.97 and 1.98;

Wireless cellular networks are known in which the area covered by the network is divided into a number of cells. Each cell is served by a base transceiver station. The base transceiver station is arranged to communicate with mobile stations in the cell associated with the base station. The mobile stations establish via the base station a connection with another user, a fixed line telephone or the Internet.

Programmable keys are known. For example, plastic cards with magnetic strips are used as keys to open locks to for example doors or the like. The use of such keys is disadvantageous in that different keys are provided to access different entities and therefore need to be carried by the user.

It has been proposed to allow multiple users access to the same entity. For example, a front door to an office may be accessed by a number of users or a hotel room may be accessed by different users at different times. It is necessary for the accessed entity to have a database or similar to keep a record of the authorised users. It is disadvantageous if a database or similar needs to be associated with the accessed entity. For example, in a hotel, to have a database associated with each lock would be costly.

It is an aim of embodiments of the present invention to address one or more of the problems discussed earlier.

BRIEF SUMMARY OF THE INVENTION

According to a first aspect of the present invention there is provided an access device comprising means for receiving a key and validity information, wireless communication means for establishing a connection with another party, said wireless communication means being arranged to provide said key and said validity information to said another party, wherein if said key and said validity information are determined by the another party to be valid access is provided.

According to a second aspect of the present invention there is provided an access method comprising the steps of receiving a key and validity information, establishing a wireless connection with another party, providing said key and said time related information to said another party, and checking at said another party if said key and said time related information are valid and if so providing access.

BRIEF DESCRIPTION OF THE SEVERAL VIEWS OF THE DRAWING(S)

For a better understanding of the present invention and as to how the same may be carried into effect, reference will now be made by way of example to the accompanying drawings in which.

Figure 1:
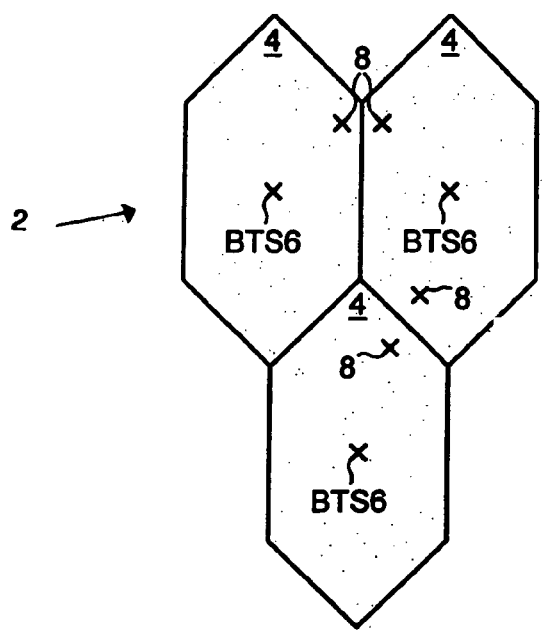
FIG. 1 shows a schematic diagram of a cellular network.

Reference is made to FIG. 1 which shows a cellular network 2. The area covered by the network 2 is divided into a plurality of cells 4. Three cells 4 are shown in FIG. 1. However, it should be appreciated that in networks there will typically be many more cells.

Each cell 4 has associated therewith a base transceiver station 6. Each base transceiver station 6 is arranged to receive signals from and send signals to mobile stations 8 in the cell associated with the base station 6. Depending on the method of communication, the mobile stations may communicate with the base stations of adjacent cells. In some embodiments of the present invention, a mobile station may be able to communicate with two or more base stations at the same time.

The mobile stations and base transceiver stations typically use radio frequency signals to communicate. The base stations and mobile stations may use a frequency division multiple access technique. This means that the available frequency spectrum is divided up into a number of bands and the mobile station will be allocated a given frequency to communicate with the base station with the base station being allocated another frequency to communicate with the mobile station. Generally, the frequencies will be different but this is not essential. The mobile stations and the base stations may use a time division multiple access technique. With this method, a frequency band is divided up into a number of time slots and a mobile station is allocated a given one of those time slots to communicate with the base station and vice versa. In the GSM (global system for mobile communication) standard, a combination of frequency division multiple access and time division multiple access is used. Spread spectrum techniques such as code division multiple access may also be used. In this technique, different spreading codes are used by different mobile stations so that the signals from the different mobile stations can be distinguished. Similarly, the different base stations will use different spreading codes. In the third generation system, a wideband CDMA system has been proposed. It should be appreciated that in embodiments of the present invention, any of these techniques may be used either on their own or together. It is of course possible that any other suitable techniques may be used.

DETAILED DESCRIPTION OF THE INVENTION

Figure 2:
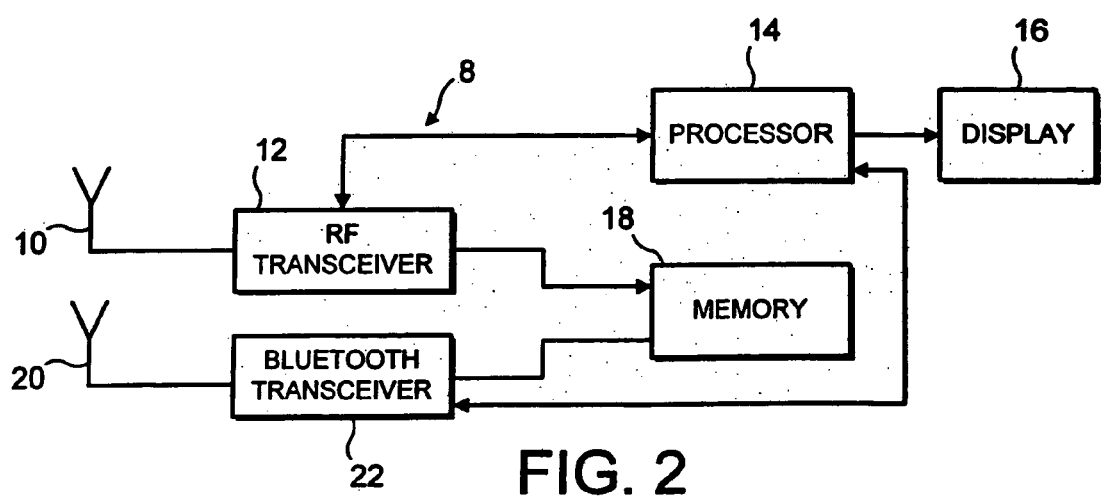
FIG. 2 shows a block diagram of a mobile station embodying the present invention.

Reference is now made to FIG. 2 which shows a block diagram of a mobile station embodying the present invention. The mobile station 8 has a first antenna 10. The first antenna 10 is arranged to receive signals from the respective base transceiver station 6. The first antenna 10 is also arranged to transmit signals to the base station 6.

The signals received by the first antenna 10 are forwarded to a radio frequency transceiver 12. The radio frequency transceiver 12 will down convert the radio frequency signals to a baseband frequency. The radio frequency transceiver may perform other functions such as decoding, demodulation or the like. The received information at the baseband frequency is forwarded by the radio frequency transceiver 12 to a processor 14 which extracts the necessary information from the received signal. The processor 14 may be arranged to provide an output which is connected to a speaker which may provide received voice signals. The processor 14 may receive control information from the base station which is used to control the mobile station or the like. The processor 14 may also extract information which is to be displayed and display that information on a display 16. The processor may also receive an input from a user interface such as a keyboard or the like.

The processor 14 is also used to process signals to be transmitted by the first antenna 10 and may also receive an output from for example a microphone or the like. The signals which are to be transmitted by the first antenna are output by the processor 14 at the baseband frequency. The radio frequency transceiver 12 upconverts the baseband signals to the radio frequency and forwards them to the first antenna 10 for transmission. The radio frequency transceiver may encode the information, modulate it or carry out any other processing of the signal.

The radio frequency transceiver 12 may be connected to a memory 18. The memory 18 is arranged to store some information received by the radio frequency transceiver. In alternative embodiments of the present invention, the memory may be connected to the processor 14 and so may receive information via the processor.

The mobile station 8 has a second antenna 20. The second antenna is arranged to receive and transmit signals in the BLUETOOTH wireless PC card range of frequencies. BLUETOOTH wireless PC card is a standard which has been proposed for short range, low power, high frequency signals. Typically, the signals will be of the order of a giga Hertz. The second antenna 20 is arranged to receive BLUETOOTH wireless PC card signals from a BLUETOOTH wireless PC card device. The signals received by the second antenna are forwarded to a BLUETOOTH wireless PC card transceiver 22. The BLUETOOTH wireless PC card transceiver 22 performs similar functions to the radio frequency transceiver 12. In particular, the BLUETOOTH wireless PC card transceiver 22 downconverts the received signals to a baseband frequency. If required, the BLUETOOTH wireless PC card transceiver may demodulate and decode the received signal. The received signals may be forwarded to the processor 14 for further processing.

The BLUETOOTH wireless PC card transceiver 22 is also arranged to receive information from the processor 14. The received information is at the baseband frequency, and the BLUETOOTH wireless PC card transceiver upconverts the signals to the BLUETOOTH wireless PC card frequency so that they can be transmitted by the second antenna. If required, the BLUETOOTH wireless PC card transceiver 22 will modulate, encode and perform any other required function.

The BLUETOOTH wireless PC card transceiver 22 is arranged to have access to the memory 18 and can retrieve information stored therein. In alternative embodiments of the present invention, the information may be retrieved by the processor from the memory and forwarded to the BLUETOOTH wireless PC card transceiver 22.

Figure 3:
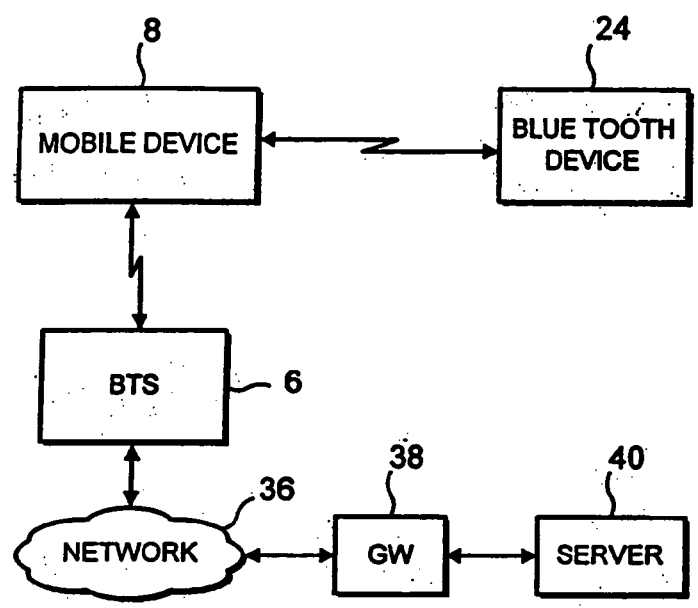
FIG. 3 shows a block diagram of the entities with which the mobile station communicates.

Reference will now be made to FIG. 3, which schematically illustrates embodiments of the present of the present invention. The mobile station 8 is arranged to have a BLUETOOTH wireless PC card connection with a BLUETOOTH wireless PC card device 24. This means that signals are exchanged between the mobile device and the BLUETOOTH wireless PC card device in accordance with the BLUETOOTH wireless PC card standard. With the BLUETOOTH wireless PC card standard, two devices are able to communicate directly without going via, for example, a base station.

In embodiments of the present invention, it is proposed that the BLUETOOTH wireless PC card device be a lock or an access device. For example, the BLUETOOTH wireless PC card device may be provided on a hotel door. The BLUETOOTH wireless PC card device may be part of an access device. For example, the access device 24 may permit access to a cinema, public transport, a ski lift or the like. Alternatively, the BLUETOOTH wireless PC card device may, for example, be incorporated in a rental car or the like. Embodiments of the present invention are particularly suitable for allowing access to a given user temporarily. However, embodiments of the present invention can be used in other situations.

The communications between the mobile device and the BLUETOOTH wireless PC card device 24 are via the second antenna 20 of the mobile station 8.

Figure 4:
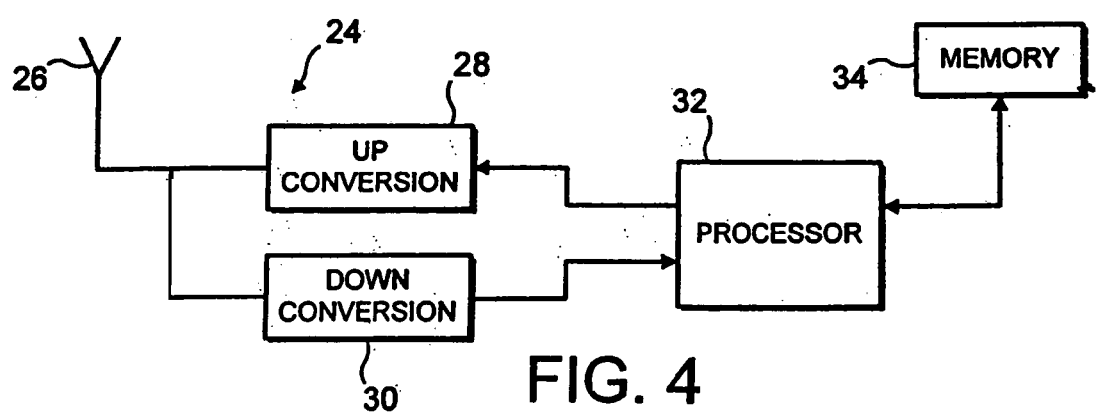
FIG. 4 shows the Bluetooth device of FIG. 3 in more detail.

Reference is made to FIG. 4, which shows the BLUETOOTH wireless PC card device 24 of FIG. 3 in more detail. The BLUETOOTH wireless PC card device 24 has an antenna 26. This antenna 26 is arranged to receive and transmit signals at the BLUETOOTH wireless PC card frequency. More particularly, the antenna 26 is arranged to transmit signals to the second antenna of the mobile station and to receive signals therefrom. The BLUETOOTH wireless PC card device has an upconverter 28. The upconvertor 28 is arranged to upconvert signals from a baseband frequency to the BLUETOOTH wireless PC card frequency for transmission by the antenna 26. The upconverter 28 may carry out other functions such as modulation, encoding or any other suitable function.

The signals which are received by the antenna 26 are processed by a downconverter 30 which reduces the frequency of the received signals from the BLUETOOTH wireless PC card frequency to the baseband frequency. Again, the downconverter 30 may perform other functions such as demodulation or decoding.

The signals which are received by the antenna 26 and down converted by the downconverter 30 are output to a processor 32, which is able to process the received signals further. Likewise, the processor 32 is arranged to output those signals which are to be transmitted to the upconverter 28. The BLUETOOTH wireless PC card device 24 also has a memory 32 which is used to store information. This will be described in more detail hereinafter.

Referring back to FIG. 3, the mobile station is also able to communicate with the base transceiver station 6 using the first antenna 10. The base transceiver station provides a connection to other elements of a network 36. The network 36 is connected to a gateway element 38 which, usually is part of the network 36. The gateway element 38 allows the network to be connected to an external entity, such as another network, the Internet or a server 40 of a service provider.

Figure 5:
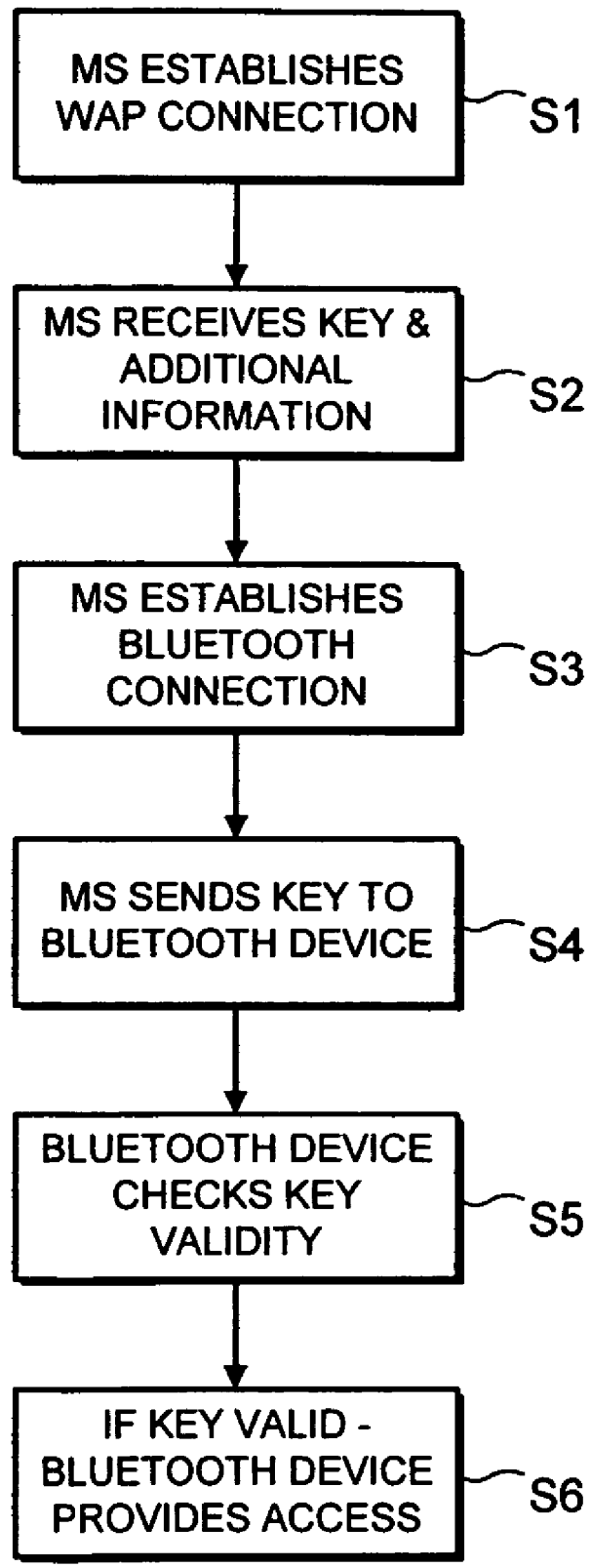
FIG. 5 illustrates the method embodying the present invention.

Reference will now be made to FIG. 5, which shows a flow diagram of the steps of the method embodying the present invention and illustrates how embodiments of the present invention work. The mobile station 8 is arranged in step S1 to establish a connection with the network 36 via the base transceiver station 6. In the embodiment described, the mobile station is a WAP (wireless application protocol) mobile station. However, it should be appreciated that the mobile device may be in accordance with any other protocol and may, for example, be able to use the short message servicing SMS feature in embodiments of the invention. The network is also arranged to establish via the gateway 38 a connection with a server. This server 40 is associated with the service provider. For example, if embodiments of the present invention are to be used to allow access to hotel rooms, then the server 40 would be associated with the hotel. As an alternative, the mobile station 8 could also access the server provider via BLUETOOTH wireless PC card transceiver connected to the server. In this way, the mobile station can get the key over the BLUETOOTH wireless PC card connection without the need for network connection. Cost would also be reduced. If, however, an order for a service (for example a hotel room) was made in advance, the key could be obtained remotely via the base transceiver station 6 using WAP and SMS.

In the second step S2, the server 40 provides the mobile station with key information and additional information. For example, in the context of a hotel, the additional information could take the form of the hotel room. In this particular embodiment, the key and additional information are downloaded to the mobile station in the same call where the mobile station establishes the connection.

However, in alternative embodiments of the present invention, it is possible that the mobile station in step 1 establish a WAP connection and provides an indication to the server as to the particular service required. The server may then cause the mobile station to be called back with the required key and additional information.

The key information which is sent to the mobile station is usually encrypted. The whole of the key may be encrypted or only part of the key may be encrypted. In alternative embodiments of the present invention, the key may not be encrypted. If the key is encrypted, the mobile station may be able to decrypt all or part of the key information. However, in preferred embodiments of the present invention, the mobile station is not able to decrypt the key information. The additional information which is sent to the mobile station may also be encrypted but this is not necessary. Where this additional information is encrypted, the mobile station will usually be able to decrypt that information. For example, if the additional information relates to a room key, the user will need to know which hotel room the user is allowed access to. This additional information may be communicated to the user. For example, the information may be displayed on the display or may take the form of a voice message. Once the additional information has been received by the mobile station, the connection with the server 40 is terminated.

In the next step S3, the mobile station is arranged to establish a BLUETOOTH wireless PC card connection with the BLUETOOTH wireless PC card device 24. The connection with the BLUETOOTH wireless PC card device 24 can take place some time after the first two steps are being completed. As indicated previously, BLUETOOTH wireless PC card is a standard which has been proposed to permit the direct communication between two devices. One feature of the BLUETOOTH wireless PC card standard is that each packet is transmitted with a different frequency.

Once the BLUETOOTH wireless PC card connection has been established, in step S4 the mobile station sends the key information to the BLUETOOTH wireless PC card device. This may be in response to a request from the BLUETOOTH wireless PC card device for the key.

In the step S5, the BLUETOOTH wireless PC card device will check the validity of the key. In particular, the BLUETOOTH wireless PC card device attempts to decrypt the keys and will compare it with key information which it has stored thereon.

In step S6, if the key is valid, then the BLUETOOTH wireless PC card device 24 will provide access for example to the room.

In the embodiments of the present invention, it is envisaged that the mobile station could be used to store more than one key. So that the BLUETOOTH wireless PC card device 24 is able to receive the correct key, it is preferred that each key has an identification tag which identifies the service provider. The BLUETOOTH wireless PC card device would in its request sent to the mobile station for the key include this information identifying the associated service provider. The mobile station would then only send the key(s) which have the tag associated with the given service provider. Where a number of different keys are associated with the give service provider, the BLUETOOTH wireless PC card device could try all of the keys to see which one matches. It is of course possible in embodiments of the present invention that each BLUETOOTH wireless PC card device has a unique identity tag so that the mobile station only sends the key which matches that identity tag provided by the BLUETOOTH wireless PC card device.

In alternative embodiment of the present invention, the mobile station may provide all of the keys which it has to the BLUETOOTH wireless PC card device which will then test all of them in order to determine which key is the correct key. This may be less preferable to those embodiments where security is of importance.

The key may have a time limit beyond which it is not valid. For example, a hotel room key may be only valid for the time that the user stays in the hotel. Accordingly, in some embodiments of the present invention, time information may form part of the key. Alternatively, there may be separate information provided relating to time information. The BLUETOOTH wireless PC card device, when determining if the key is valid or not, will check to see whether or not the key is still valid. The time information may take any suitable format such as a start time and/or an end time or any other suitable format. For this, the BLUETOOTH wireless PC card device will require access to a clock. That may be part of the BLUETOOTH wireless PC card device itself or the information may be provided by the mobile station.

In embodiments of the present invention, asymmetric encryption or symmetric encryption may be used. With symmetric encryption, the same key is used for encrypting as for decrypting. With asymmetric encryption, different keys are used for encryption and decryption. For example, public and private keys may be used. Thus, the data may be encrypted with a public key which is well known and decrypted with a private key which is only known to a given user. It should be appreciated that any suitable form of encryption and decryption could be used.

In order to further increase the security, a hash code can be applied to the key data.

It should be appreciated that any suitable way of transmitting key data securely between the server, the mobile station and the BLUETOOTH wireless PC card device may be used. In many of these forms the BTS and GW would not be needed.

In embodiments of the present invention, the mobile device has been described as being a mobile station. It should be appreciated that any suitable device can be used. For example, items such as wrist watches could be modified so as to provide the functions of the embodiments of the present invention. Indeed, dedicated devices may be provided in order to perform the functions of embodiments of the invention. It has been proposed to provide a credit card type device which has the capability of making radio connections. Embodiments of the present invention may be incorporated in such devices.

In embodiments of the present invention, the mobile station has been described as using the BLUETOOTH wireless PC card protocol. However, in alternative embodiments of the present invention, different radio frequencies can be used. For example, infrared, wireless LAN and HomeRF could be used instead of the BLUETOOTH wireless PC card.

Embodiments of the present invention may be used in a wide range of situations. For example, the mobile station 8 may receive from the server a ticket for a sporting event, theatre or cinema. The mobile station may receive from the server a key which allows a rented car to be driven. The mobile station may receive tickets which allow the user to travel on public transport such as aeroplanes, buses or trains. Embodiments of the present invention may be arranged to provide access to for example ski lifts. Embodiments of the present invention are particularly applicable to the provision of temporary access for example to a hotel or access to a cinema. However, embodiments of the present invention can be used to permit a user to obtain access to more permanent services. For example, embodiments of the present invention can be arranged to allow a user to access their office or home.

The additional information will be appropriate for a particular service. In the context of a hotel room, the additional information will take the form of the room number. In the case of car rental, the additional information will take the form of the registration number of the car and/or a reference. In the case of tickets to an event, the information may take the form of the seat information. The additional information may also provide time information. For example, the amount of time for which a hotel room is available may be included. In embodiments of the present invention, the same technique can be used to obtain more user time. For example, in the case of a rental car the user may use the same technique in order to obtain a longer rental time.

In embodiments of the present invention, there is no need to connect each of the BLUETOOTH wireless PC card devices together to a central control element. This is because of the provision of information relating to the time for which the key is valid. In the case of a lock, the key used by the lock does not have to be continually changed. For example, a hotel room may be validly opened by a user one day, but if the user has not requested the room for an additional day, the user will not be permitted to enter that room on the next day. Thus, the need for additional infra structure connecting the BLUETOOTH wireless PC card devices can be avoided. The validity time for the key can be in the non-encrypted part of the key so that the mobile station can remove it automatically. Also, this would allow the BLUETOOTH wireless PC card device to send a request to the mobile station to remove the key. As an alternative, rather that a valid time information, any other validity information indicating the validity of the user or validity of the use of the item being accessed can be transferred. For example, a maximum speed for a hire car during use could be stipulated.

The access key is stored in the memory 18 of the mobile station. Alternatively, the access key may be stored in an integrated part of the device for example on a smart card. The key information is also stored in the memory 34 of the BLUETOOTH wireless PC card device. Again, the information may be stored in any other suitable location in the BLUETOOTH wireless PC card device.

Mobile stations or devices embodying the present invention may store any number of different keys for different purposes.

In alternative embodiments of the present invention, the mobile station may be arranged to provide the BLUETOOTH wireless PC card device with user identification information. This may be part of the key or separate therefrom. This information can be used to provide additional security. For example, in the car rental situation, the user may be required to identify himself by entering a personal identification number code to prevent misuse or crime. Additionally, the key may be stored in the part of the memory which requires the user to enter their personal identity number (PIN). Without the PIN the mobile station will not send the key. Additionally, each key can be provided with its own PIN. The user needs to know the PIN in order to use the key. The mobile station sends the key together with the PIN (the PIN could be, for example, part of the key for decryption). Furthermore, no PIN might be required.

It is preferred that the validity time for the key be encrypted. This means that the mobile station can automatically delete those keys which are out of date.

The keys are preferably stored in a tamper proof memory which may be an ASIC, smart card or the like.

In alternative embodiments of the present invention, a single antenna may be provided in the mobile station and the key information and the like may be provided to the mobile station using the same antenna which is used to send the key information to the accessed entity. That single antenna may be arranged to use the BLUETOOTH wireless PC card standard or the usual mobile station frequencies.

The invention claimed is:

1. An apparatus comprising:
A mobile communication device having a first transceiver configured to communicate through a cellular network with a server associated with a service provider to receive and store in a memory a key from the service provider, the key having an identification tag identifying the service provider and validity information relating to a service provided by said service provider; said mobile communications device further having a processor and a second transceiver, said processor configured to cause the mobile communications device to receive and transmit short range, low power, high frequency signals through the second transceiver;
an access device having a transceiver for communicating with the mobile communications device through the second transceiver, wherein the access device isconfigured to receive said key and said validity information, wherein the access device is configured to determine, without any connection to the service provider whether or not the key and the validity information are valid and if said key and validity information are valid, then the access device is configured to provide access to the service.

2. The apparatus of claim 1, wherein the mobile communications device is configured to receive additional information relating to said service.

3. The apparatus of claim 1, wherein the mobile communications device is configured to receive additional information relating to said service and make said additional information available to a user of the apparatus.

4. The apparatus of claim 1, further comprising a display configured to display additional information relating to said service.

5. The apparatus of claim 1, further comprising a speaker configured to provide additional information relating to said service audibly.

6. The apparatus of claim 1, wherein said second transceiver is configured to operate using high frequency signals in the giga Hertz range.

7. The apparatus of claim 1, wherein said second transceiver is configured to operate using infrared signals.

8. The apparatus of claim 1, wherein said access device provides access to one or more of the following:
hotel room; theatre; cinema; hire car; ski lift; public transport; or office.

9. The apparatus of claim 1, wherein at least part of said key and/or said validity information are at least partly encrypted.

10. The apparatus of claim 1, wherein at least part of said key and/or said validity information are at least partly encrypted, and wherein at least part of said key is not decryptable by said apparatus.

11. The apparatus of claim 1, wherein the mobile communications device is configured to provide to said access device information identifying a user of said apparatus.

12. The apparatus of claim 1, wherein said validity information comprises time related information.

13. The apparatus of claim 1, the mobile communications device is configured to store more than one key at the same time.

14. The apparatus of claim 13, wherein said access device is configured to provide an identifier associated with the service provider, and said mobile communications device is configured to provide the key, from the more than one stored keys, that matches said identifier to said access device.

15. A method comprising:
establishing a communication link between a first transceiver of a mobile communication device and a server associated with a service provider;
receiving a key from the service provider, the key having an identification tag identifying the service provider and validity information related to a service provided by the service provider;
establishing a short range, low power, high frequency signal communication link between a second transceiver of the mobile communication device and an access device;
transmitting said key and said validity information to the access device;
receiving said key and said validity information at the access device and processing said key and said validity information to determine, without any connection to the service provider whether or not the key and the validity information are valid; and
wherein, if said key and validity information are valid, then causing the access device to provide access to the service.

16. A method as claimed in claim 15, wherein said validity information comprises time related information.

17. The method of claim 15, further comprising receiving additional information relating to said service and making said additional information available to a user.

18. The method of claim 15, further comprising:
receiving identification information from the access device; and
providing a key associated with the received identification information to said access device.

19. The method of claim 15, further comprising:
receiving identification information from the access device; and
providing a key having an identifier identifying a service provider associated with the received identification information to said access device.

20. The method of claim 15, comprising providing access to one or more of a hotel room; theatre; cinema; hire car; ski lift; public transport; or office if said key and said validity information are valid.

21. The method of claim 15, further comprising at least partly encrypting at least part of said key and/or said validity information.

22. The method of claim 15, further comprising providing user information to said access device.

23. A communication device for accessing via an access device a service provided by a service provider, the communication device comprising:
a first transceiver for establishing a connection with a communication network, a second transceiver for establishing a connection with the access device, wherein said first and second transceivers operate at different frequencies;
a memory for storing a key having an identification tag identifying the service provider which is received at the first transceiver from the service provider via the communication network; and
a processor for providing said key via the second transceiver to the access device in response to a request from the access device identifying the service provider,
wherein said access device determines, without any connection to the service provider, whether the key is valid, and wherein, if said key is determined by the access device to be valid, access is provided to said service.

24. A user device arranged to:
receive from a service provider, via a first communication link, at least one key having an identification tag identifying the service provider and validity information relating to a service provided by said service provider.
establish a second communication link with an access device, said second communication link arranged to provide said validity information and all keys having the identification tag identifying the service provider to said access device in response to a request from the access device identifying the service provider,
wherein said access device identifies a matching key from the provided keys, and said matching key and said validity information allow said access device to determine, without any connection with the service provider. whether or not to provide access, wherein if said key and said validity information are determined by the access device to be valid access is provided, and wherein said first and second communication links operate at different frequencies.

25. The communication device of claim 23, wherein the second transceiver is configured to operate as a wireless communication link.

26. The communication device of claim 23, wherein the first and second transceivers are configured to operate at different frequencies.

* * * * *